US009502077B2

(12) United States Patent
Biskeborn et al.

(10) Patent No.: US 9,502,077 B2
(45) Date of Patent: *Nov. 22, 2016

(54) SHINGLE VERIFY ARCHIVE APPLIANCE

(71) Applicant: International Business Machines Corporation, Armonk, NY (US)

(72) Inventors: Robert G. Biskeborn, Hollister, CA (US); Calvin S. Lo, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/819,366

(22) Filed: Aug. 5, 2015

(65) Prior Publication Data

US 2016/0012860 A1    Jan. 14, 2016

Related U.S. Application Data

(63) Continuation of application No. 14/326,425, filed on Jul. 8, 2014, now Pat. No. 9,129,631.

(51) Int. Cl.
| | | |
|---|---|---|
| *G11B 27/36* | (2006.01) | |
| *G11B 5/60* | (2006.01) | |
| *G11B 5/008* | (2006.01) | |
| *G11B 20/12* | (2006.01) | |
| *G11B 20/18* | (2006.01) | |

(52) U.S. Cl.
CPC ........... *G11B 27/36* (2013.01); *G11B 5/00813* (2013.01); *G11B 5/00826* (2013.01); *G11B 5/6005* (2013.01); *G11B 20/1202* (2013.01); *G11B 20/1201* (2013.01); *G11B 20/1816* (2013.01)

(58) Field of Classification Search
None
See application file for complete search history.

(56) References Cited

U.S. PATENT DOCUMENTS

| 7,978,429 B2 | 7/2011 | Biskeborn | |
|---|---|---|---|
| 9,129,631 B1 * | 9/2015 | Biskeborn | ............ G11B 5/6005 |
| 2011/0119498 A1 | 5/2011 | Guyot | |
| 2012/0250174 A1 | 10/2012 | Sueishi et al. | |
| 2012/0281310 A1 | 11/2012 | Lim et al. | |
| 2012/0300333 A1 | 11/2012 | Tinker | |
| 2013/0148225 A1 | 6/2013 | Coker et al. | |
| 2013/0265670 A1 | 10/2013 | Judd | |

FOREIGN PATENT DOCUMENTS

| JP | 2007184015 A | 7/2007 |
|---|---|---|
| JP | 2011134385 A | 7/2011 |
| JP | 2012043507 A | 3/2012 |

OTHER PUBLICATIONS

Jaquette, G. A., "L TO: A better format for mid-range tape," IBM J. Res. & Dev., vol. 47, No. 4, Jul. 2013, pp. 429-444.
(Continued)

*Primary Examiner* — K. Wong
(74) *Attorney, Agent, or Firm* — Zilka-Kotab, PC

(57) ABSTRACT

An apparatus according to one embodiment includes a controller configured to control a write transducer to perform shingled writing where a currently written track is written over a portions of a previously written track thereby defining a shingled track comprising a remaining portion of the previously written track. The controller is also configured to cause reading of data from at least one shingled track during the shingled writing using a read transducer.

19 Claims, 14 Drawing Sheets

(56) References Cited

OTHER PUBLICATIONS

Lim et al., "Analysis of Shingle-Write Readback Using Magnetic-Force Microscopy," IEEE Transactions on Magnetics, vol. 46, No. 6, Jun. 2010, pp. 1548-1551.
Non-Final Office Action from U.S. Appl. No. 14/326,425, dated Nov. 20, 2014.
Notice of Allowance from U.S. Appl. No. 14/326,425, dated May 1, 2015.
Yamashita et al., "Performance Evaluation of Neuro ITI Canceller for Two-Dimensional Magnetic Recording by Shingled Magnetic Recording," IEEE Transactions on Magnetics, vol. 49, No. 7, Jul. 2013, pp. 3810-3813.
Biskeborn et al., U.S. Appl. No. 14/326,425, filed Jul. 8, 2014.

* cited by examiner

SHINGLE VERIFY ARCHIVE APPLIANCE

RELATED APPLICATIONS

This application is a continuation of U.S. patent application Ser. No. 14/326,425, filed Jul. 8, 2014, which is herein incorporated by reference.

BACKGROUND

The present invention relates to data storage systems, and more particularly, this invention relates to magnetic recording systems having the ability to read verify previously shingled tracks concurrently with performing write operations.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, the drive moves the magnetic tape over the surface of the tape head at high speed. Usually the tape head is designed to minimize the spacing between the head and the tape. The spacing between the magnetic head and the magnetic tape is crucial and so goals in these systems are to have the recording gaps of the transducers, which are the source of the magnetic recording flux, in near contact with the tape to effect writing sharp transitions, and to have the read elements in near contact with the tape to provide effective coupling of the magnetic field from the tape to the read elements.

The quantity of data stored on a magnetic tape may be increased by increasing the number of data tracks across the tape. Moreover, by overlapping portions of data tracks (e.g., shingling data tracks), improvements to data storage quantities are achieved. However, for various reasons, conventional products are unable to read verify shingled data tracks in real time. As a result, the only method conventionally available to certify tapes having shingled data tracks is to re-read the data of a given tape in its entirety after it is written.

BRIEF SUMMARY

An apparatus according to one embodiment includes a controller configured to control a write transducer to perform shingled writing where a currently written track is written over a portions of a previously written track thereby defining a shingled track comprising a remaining portion of the previously written track. The controller is also configured to cause reading of data from at least one shingled track during the shingled writing using a read transducer.

A controller-implemented method according to one embodiment includes writing data in shingled tracks on a magnetic recording medium, performing a read-while-write operation for verifying the data in the shingled tracks, and concurrently reading data from previously shingled tracks performing, using a controller of a data storage device, shingled writing on a magnetic recording medium where a currently written track is written over a portions of a previously written track thereby defining a shingled track comprising a remaining portion of the previously written track, and reading, using the controller, data from at least one shingled track during the shingled writing.

A computer program product for reading data from a shingled track during shingled writing according to one embodiment includes a computer readable storage medium having program instructions embodied therewith, the program instructions executable by a controller to cause the controller to perform the foregoing method.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. Furthermore, as used herein, the term "about" with reference to some stated value refers to the stated value±10% of said value.

The following description discloses several preferred embodiments of magnetic storage systems, as well as operation and/or component parts thereof. Furthermore, various embodiments described herein include the ability to read verify previously shingled tracks while concurrently performing write operations.

In one general embodiment, an apparatus includes a write transducer and a read transducer. A controller is coupled to the write transducer and the read transducer. The controller is configured to control the write transducer to perform shingled writing where a currently written track is written over a portions of a previously written track thereby defining a shingled track comprising a remaining portion of the previously written track. The controller is also configured to read data from at least one shingled track during the shingled writing.

In another general embodiment, an apparatus includes a write transducer, a first read transducer, and a second read transducer configured to read data from a shingled written track. A controller is coupled to the write transducer and the read transducers, the controller being configured control the write transducer to perform shingled writing where a currently written track is written over a portions of previously written tracks thereby defining shingled tracks comprising remaining portions of the previously written tracks. The controller is also configured to perform a read-while-write operation for verifying a data track written by the write transducer using the first read transducer. The controller is further configured to read the data in a shingled track using the second read transducer while performing the read-while-write operation.

In one general embodiment, a method includes writing data in shingled tracks on a magnetic recording medium, performing a read-while-write operation for verifying the data in the shingled tracks, and concurrently reading data from previously shingled tracks.

Figure 1A:
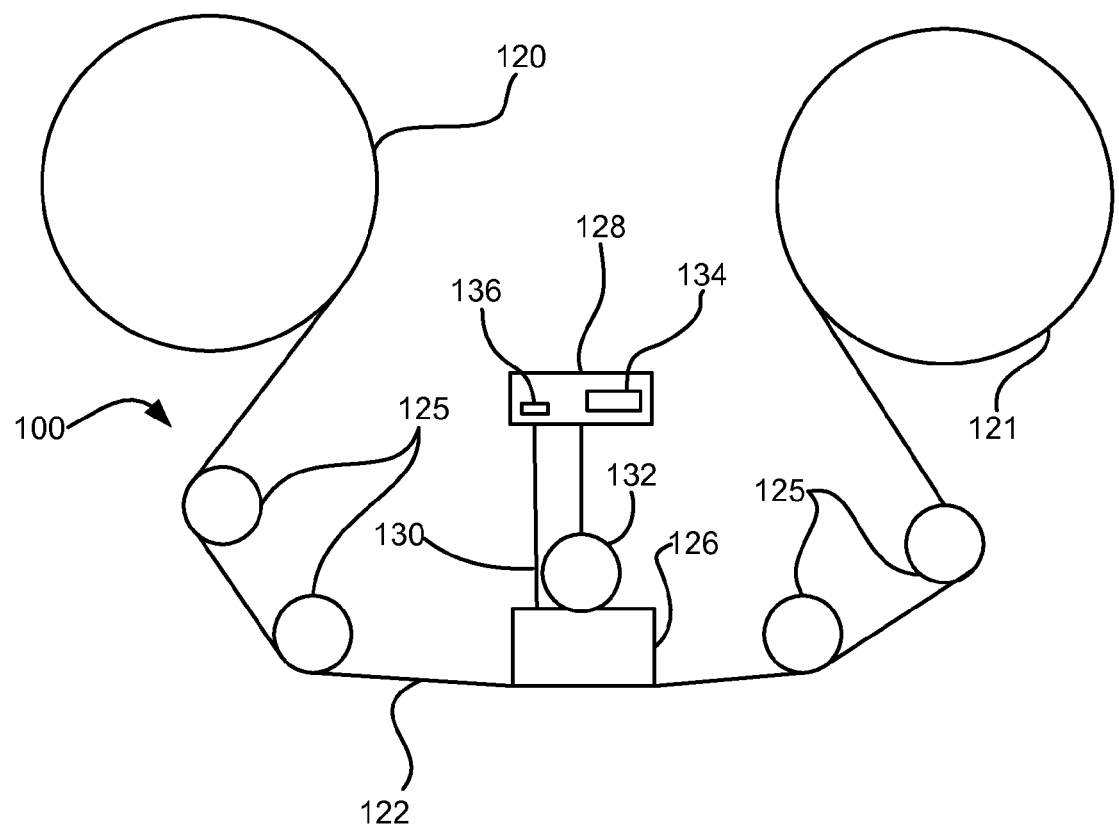
FIG. 1A is a schematic diagram of a simplified tape drive system according to one embodiment.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the tape drive 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may operate under logic known in the art, as well as any logic disclosed herein. The controller 128 may be coupled to a memory 136 of any known type, which may store instructions executable by the controller 128. Moreover, the controller 128 may be configured and/or programmable to perform or control some or all of the methodology presented herein. Thus, the controller may be considered configured to perform various operations by way of logic programmed into a chip; software, firmware, or other instructions being available to a processor; etc. and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (integral or external) to send and receive the data and for controlling the operation of the tape drive 100 and communicating the status of the tape drive 100 to the host, all as will be understood by those of skill in the art.

Figure 1B:
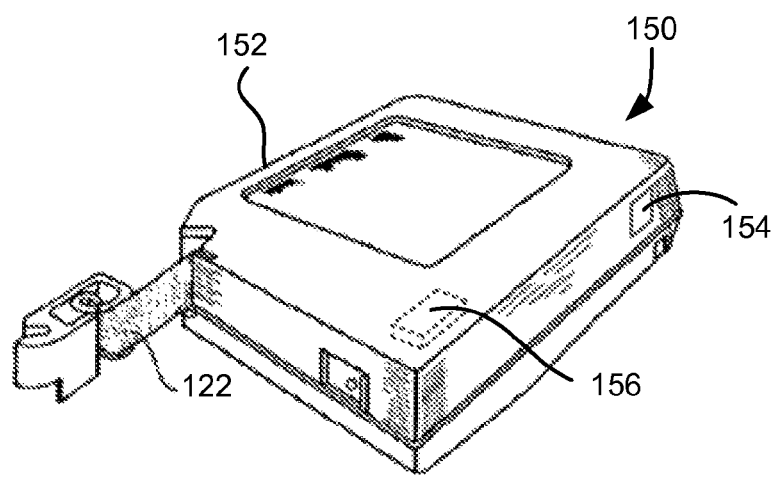
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some embodiments, the nonvolatile memory 156 may be embedded inside the housing 152, as shown in FIG. 1B. In more embodiments, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, ROM device, etc., embedded into or coupled to the inside or outside of the tape cartridge 150. The nonvolatile memory is accessible by the tape drive and the tape operating software (the driver software), and/or other device.

Figure 2:
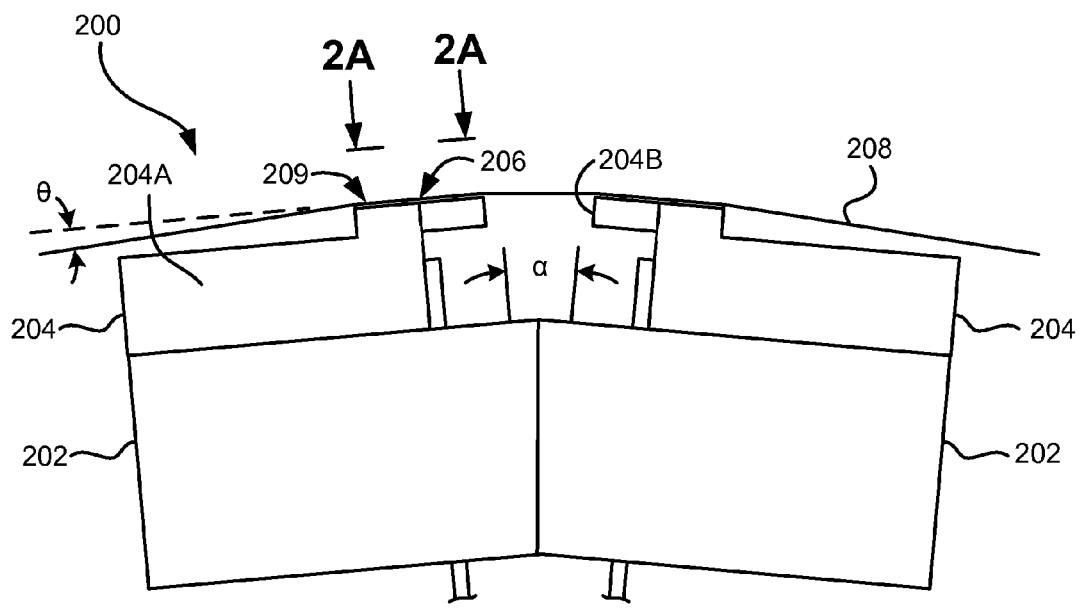
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2A:
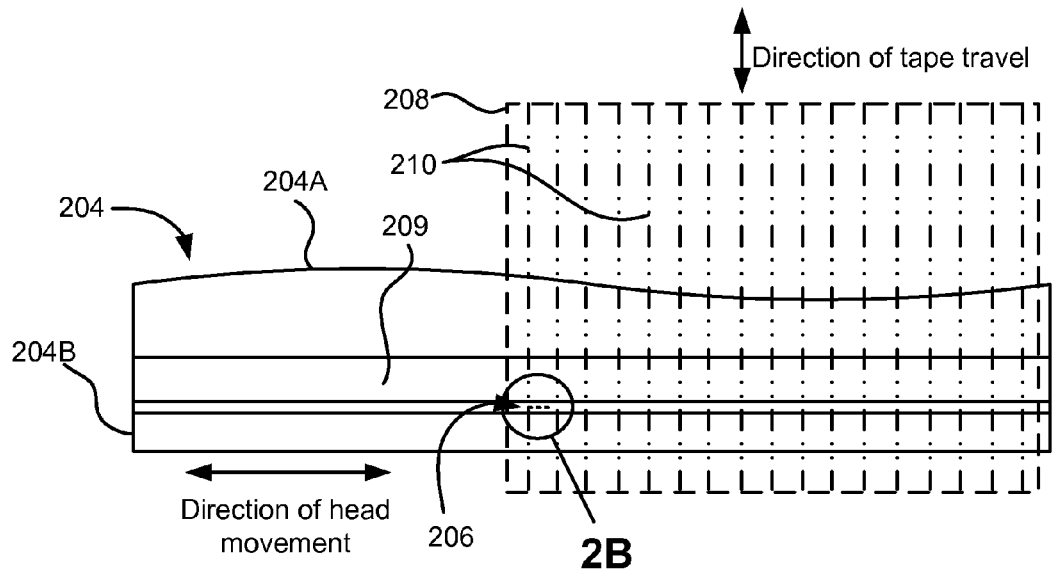
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 4 to 22 data bands, e.g., with 16 data bands and 17 servo tracks 210, as shown in FIG. 2A on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2B:
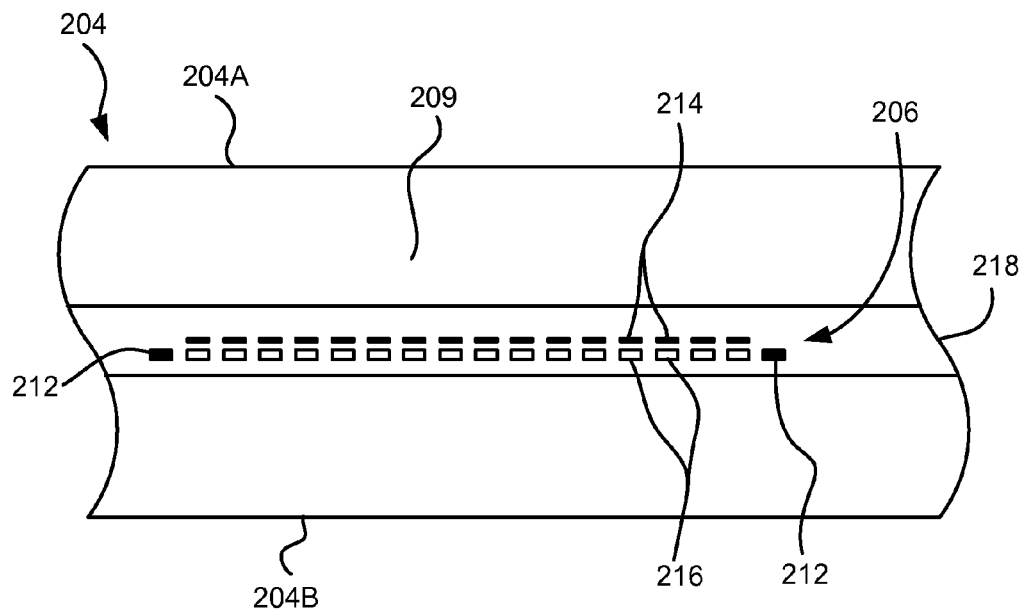
FIG. 2B is a detailed view taken from Circle 2B of FIG. 2A.

FIG. 2B depicts a plurality of readers and/or writers 206 formed in a gap 218 on the module 204 in Circle 2B of FIG. 2A. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2B, the readers 216 and writers 214 may also be arranged in an interleaved configuration. Alternatively, each array of readers and/or writers 206 may be readers or writers only, and the arrays may contain one or more servo readers 212. As noted by considering FIGS. 2 and 2A-B together, each module 204 may include a complementary set of readers and/or writers 206 for such things as bi-directional reading and writing, read-while-write capability, backward compatibility, etc.

Figure 2C:
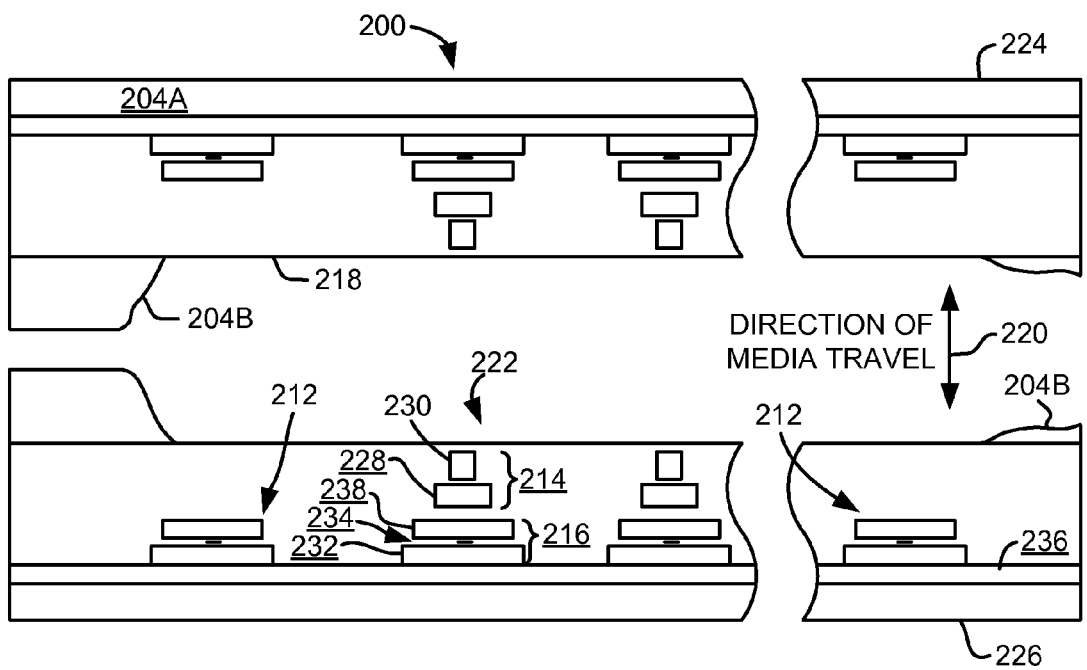
FIG. 2C is a detailed view of a partial tape bearing surface of a pair of modules.

FIG. 2C shows a partial tape bearing surface view of complimentary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write transducer 214 and the readers, exemplified by the read transducer 216, are aligned parallel to an intended direction of travel of a tape medium thereacross to form an R/W pair, exemplified by the R/W pair 222. Note that the intended direction of tape travel is sometimes referred to herein as the direction of tape travel, and such terms may be used interchangeable. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (—), CZT or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type, including those based on MR, GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

The configuration of the tape head 126 according to one embodiment includes multiple modules, preferably three or more. In a write-read-write (W-R-W) head, outer modules for writing flank one or more inner modules for reading.

Figure 4:
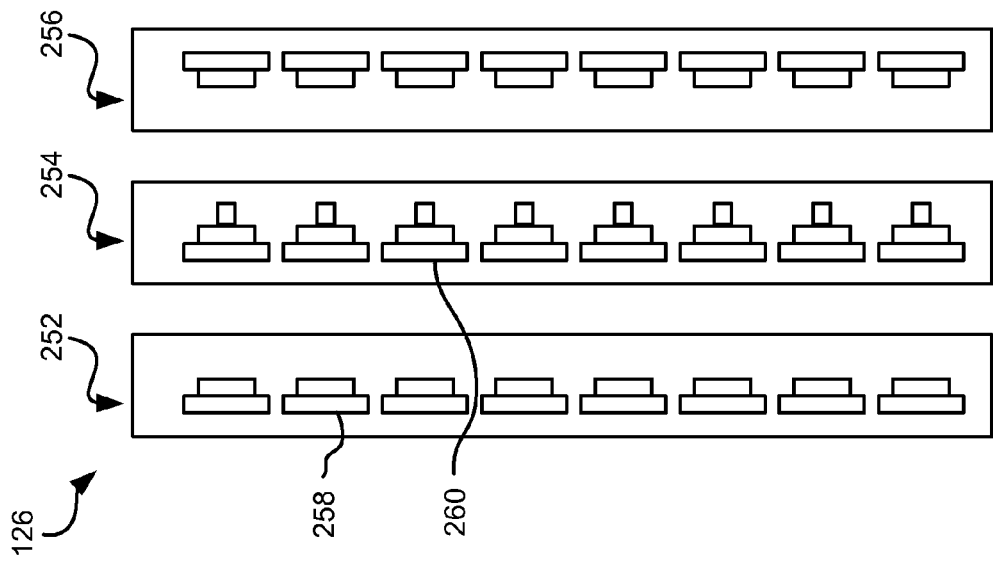
FIG. 4 is a partial tape bearing surface view of a magnetic head having a read-write-read configuration.
Figure 3:
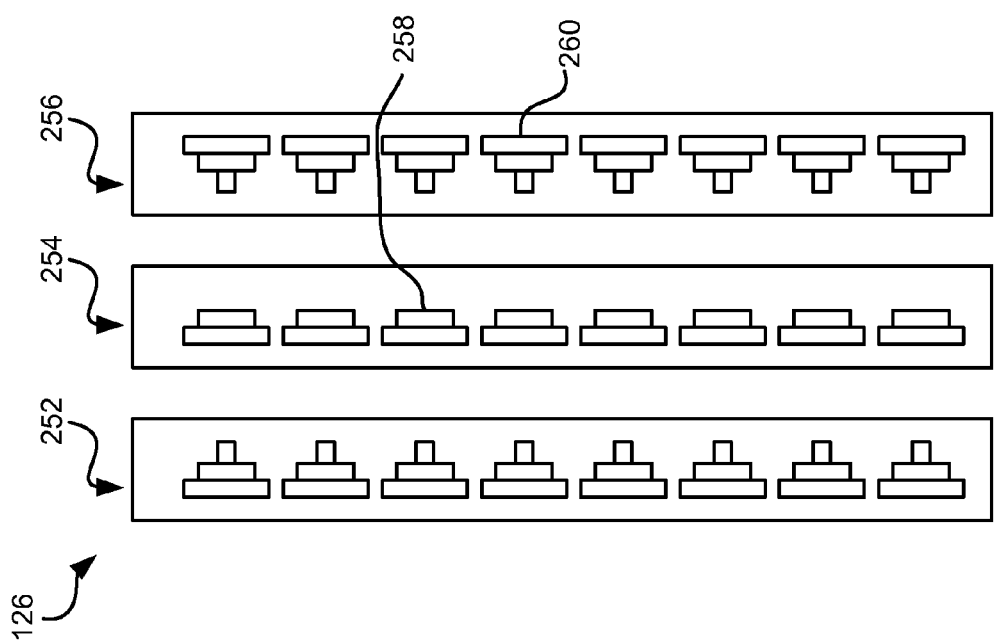
FIG. 3 is a partial tape bearing surface view of a magnetic head having a write-read-write configuration.

Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further embodiments, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration, as will be discussed in further detail below.

Figure 5:
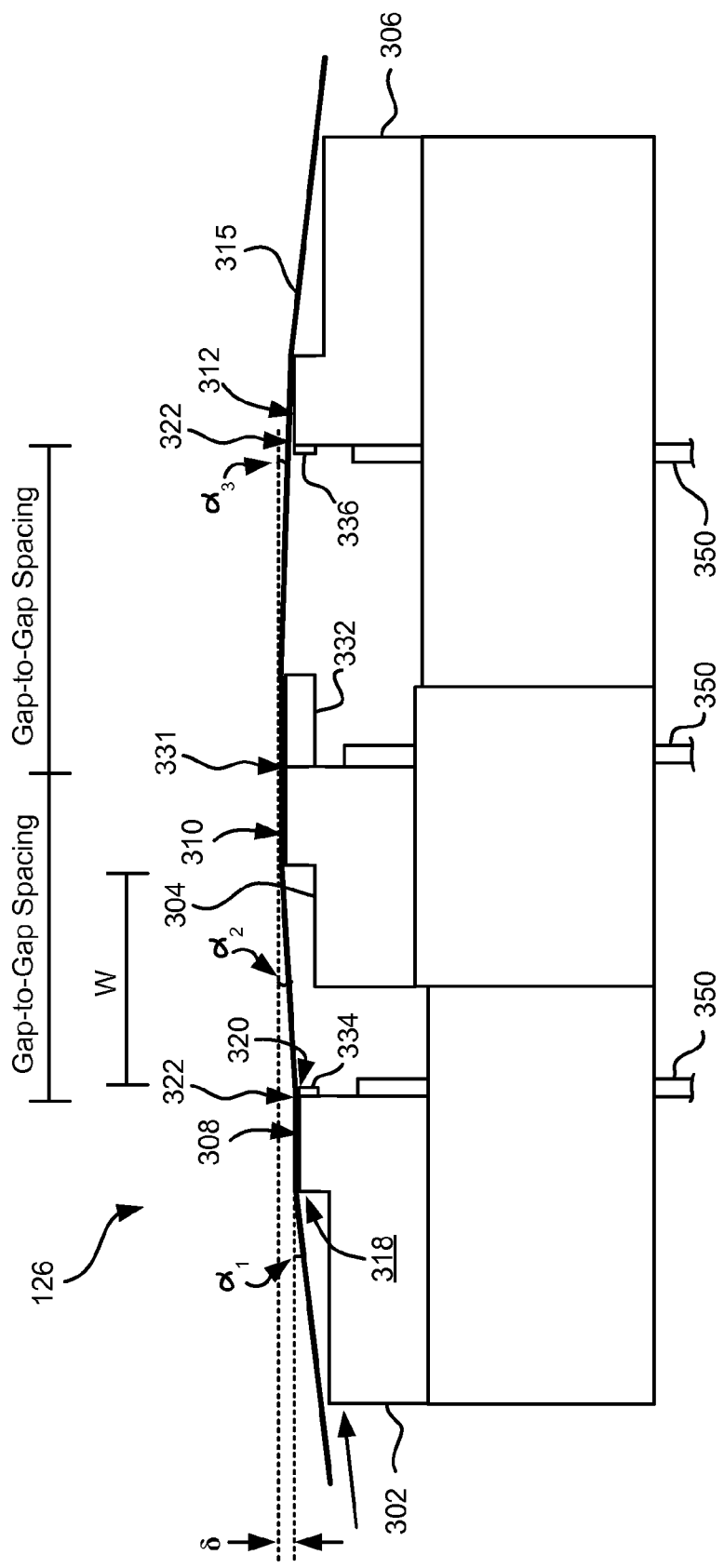
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
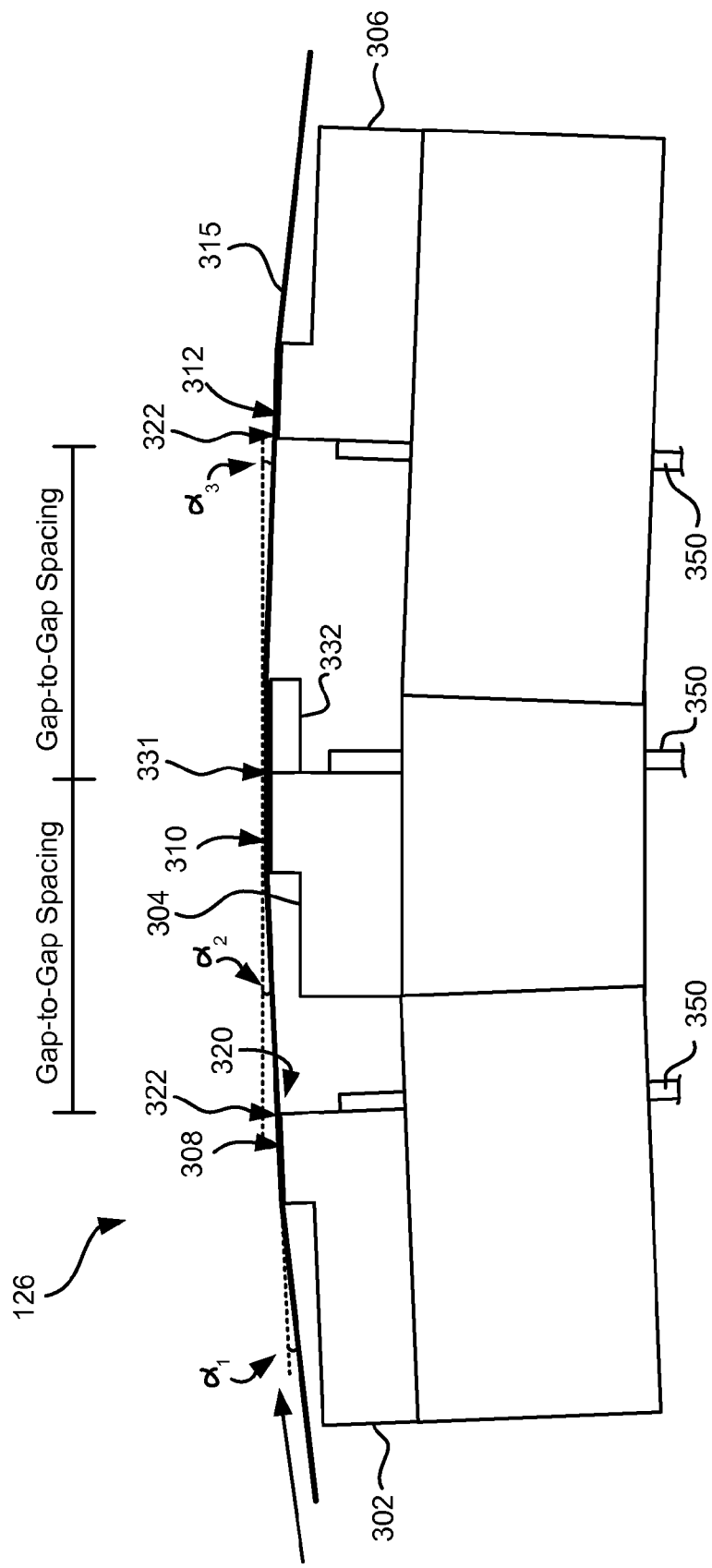
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used LTO tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
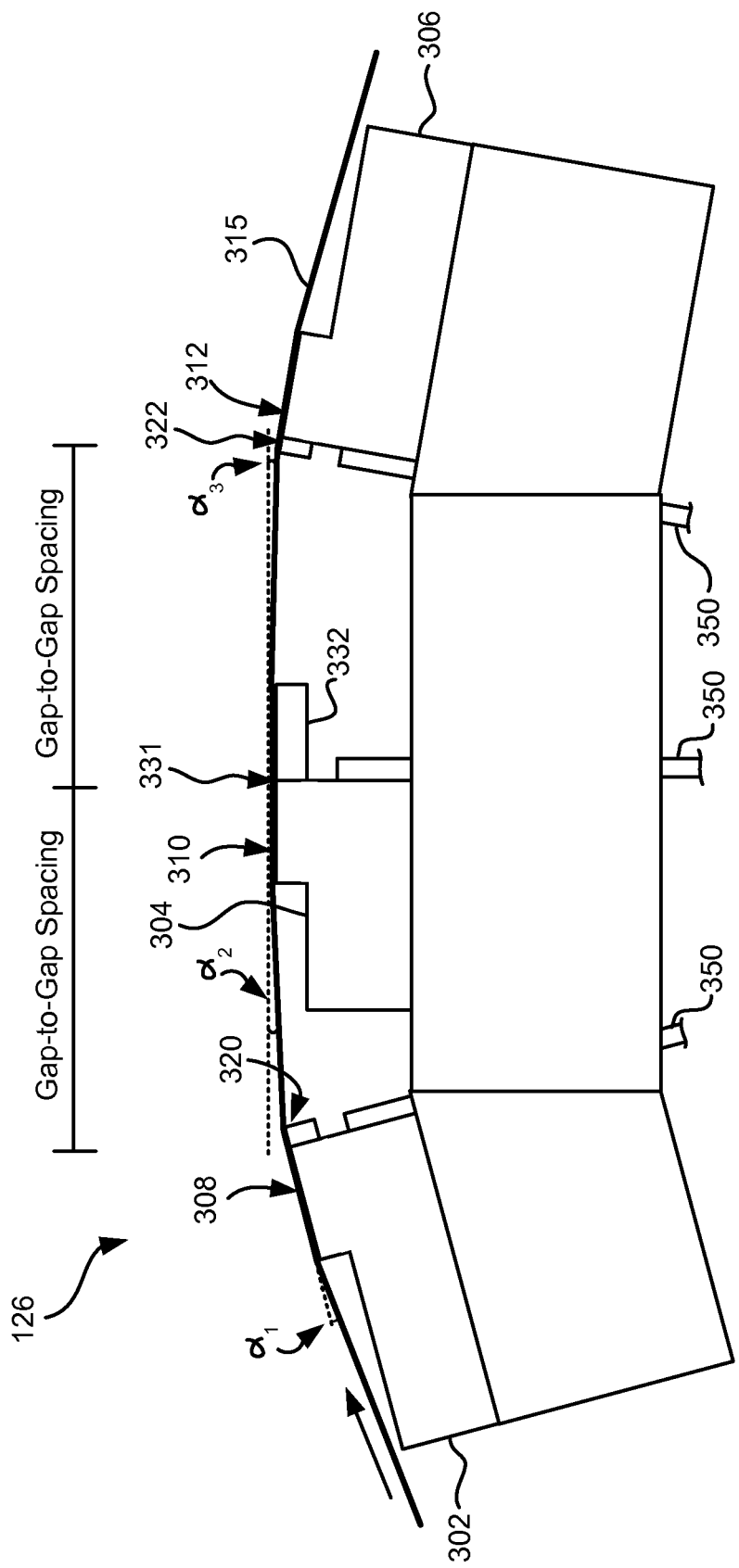
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. or alternatively by outriggers, which may be integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other embodiments, the modules may be constructed as a unitary body. Those skilled in the art, armed with the present teachings, will appreciate that other known methods of manufacturing such heads may be adapted for use in constructing such heads.

Users requesting archival recording may desire that tapes are written with high quality for a particular medium to satisfy auditing, retention and other mission critical characteristics. Thus, it is desirable that read-while-write operations be performed while transferring data to a magnetic recording medium, to ensure these mission critical characteristics are met.

Many tape drives implement shingled writing in which currently written data is written over a portion of previously written tracks thereby defining shingled tracks as the remaining un-written-over portions of the previously written tracks (e.g., see FIGS. 8A-8B, 10A-10C). However, conventional products are unable to read verify written shingled tracks in real time. As a result, the only method available to certify tapes written using conventional read-write products is to re-read the data of a given tape in its entirety after it is written. This has led to users of such conventional products, particularly those with large operations and/or those with massive tape archives, having to re-read huge libraries of tapes at great expense in terms of time, resources, hardware, etc.

In sharp contrast, various embodiments described herein include the ability to read verify shingled tracks in real time, while concurrently performing write operations.

Figure 8A:
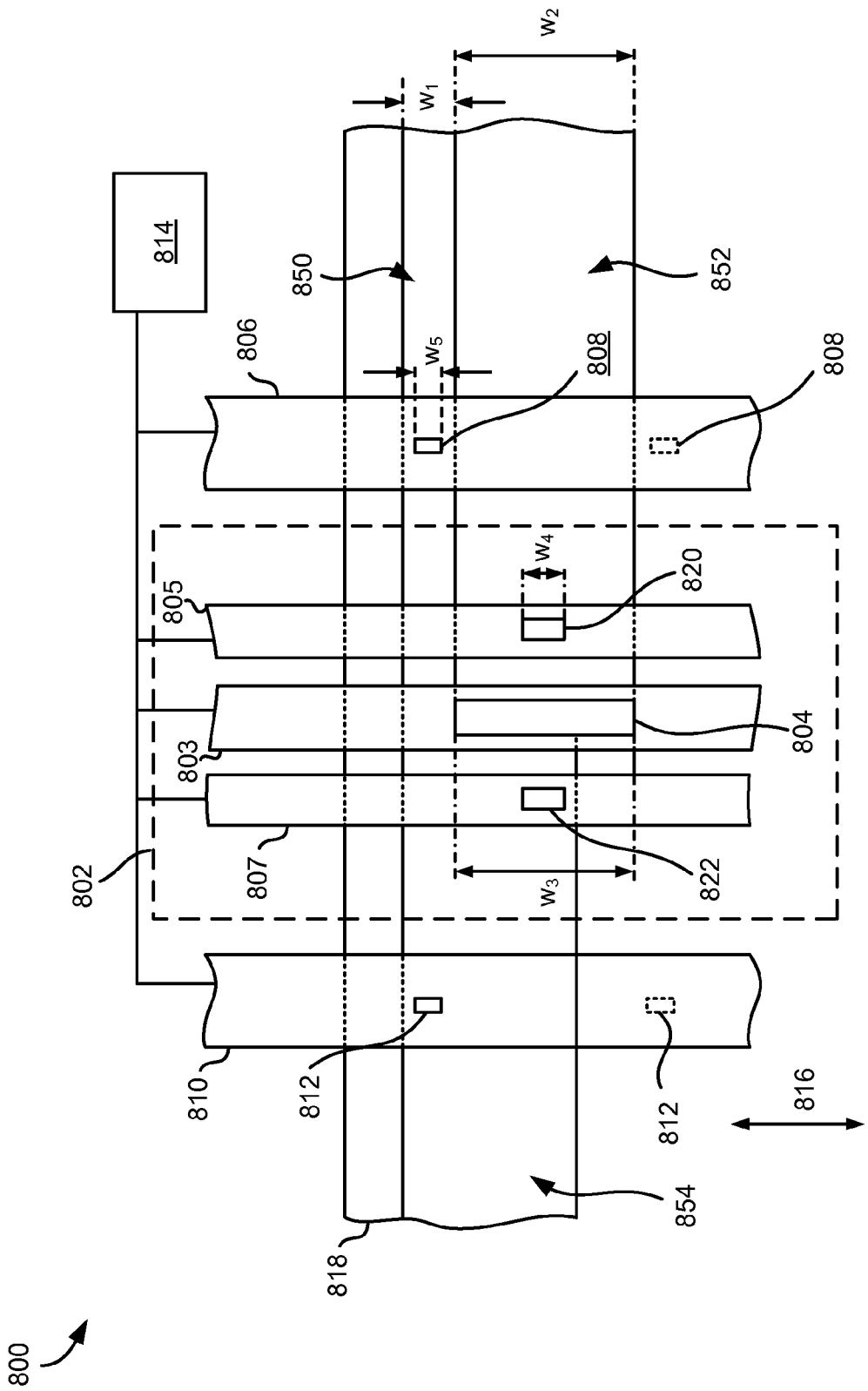
FIG. 8A is a partial top-down view of an apparatus according to one embodiment.

Looking specifically to FIG. 8A, an apparatus 800 is illustrated in accordance with one embodiment. As an option, the present apparatus 800 may be implemented in conjunction with features from any other embodiment listed herein, such as those described with reference to the other FIGS. Of course, however, such apparatus 800 and others presented herein may be used in various applications and/or in permutations which may or may not be specifically described in the illustrative embodiments listed herein. Further, the apparatus 800 presented herein may be used in any desired environment. Thus FIG. 8A (and the other FIGS.) should be deemed to include any and all possible permutations.

Referring now to FIG. 8A, the apparatus 800 includes a head 802 having a write transducer 804 positioned on a first module 803, and read transducers 820, 822 positioned on either side of write transducer 804, for reading non-shingled data tracks during a read-while-write (read verify) operation and/or reading back shingled tracks at a later time. The transducers 820, 822 are positioned on individual modules 805, 807 that may be decoupled from first module 803. However, in other approaches, transducers 820, 822 and write transducer 804 may be positioned on a common module having gaps and/or shielding materials between each of the transducers 820, 822 and write transducer 804 to prevent interference therebetween. Note that in a typical implementation for tape applications, each module would have an array of such transducers, e.g., as set forth elsewhere herein.

The apparatus 800 also includes at least a second module 806 separate from the head 802, the second module 806 having a dedicated read transducer 808. Furthermore, apparatus 800 may, as an option, include a third module 810 having a second dedicated read transducer 812 positioned thereon. Moreover, dedicated read transducers 808, 812 are preferably positioned to read shingled data tracks, as will be discussed in further detail below.

Moreover, according various embodiments, any one or more of the transducers 804, 808, 812, 820, 822 may be of a conventional type of transducer as would be appreciated by one skilled in the art upon reading the present description. Furthermore, it is preferred, but not required, that the transducers of each read transducer pair 808, 812 and/or 820, 822 are of a similar and/or the same type of transducer.

In some embodiments, two or more of the modules 803, 805, 807, 810, 806 may be coupled together and controlled by a single track-following mechanism (e.g., actuator). However, in various embodiments, some or all of the modules 803, 805, 807, 810, 806 may be independently positionable relative to each other, e.g., for track-following and/or disengagement from the tape. Thus, one or more of the modules 803, 805, 807, 810, 806 may be independently actuated (e.g., moved) relative to the other of the modules in a lateral direction and/or towards and away from the tape.

In a further embodiment, one or both of the second and third modules 806, 810 may be selectively positionable along direction 816, thereby enabling positioning of the respective transducer 808 and 812 to either side of the write transducer 804 (above and below the write transducer 804 in FIG. 8A, see shadowed transducers 808, 812). This enables the apparatus to perform read verification of shingled tracks when writing with different kinds of shingling such as serpentine, non-serpentine, etc.

Further, modules 806, 810 are not coupled to modules 805, 807 in one embodiment. Thus, modules 806, 810 may be independently positionable relative to modules 805, 807.

In another embodiment, modules 806, 810 are coupled to modules 805, 807. Thus, modules 806, 810 move with modules 805, 807.

According to an exemplary embodiment, which is in no way intended to limit the invention, the second module 806 may be disengaged from a tape during reading thereof using the other dedicated read transducer 812 and/or writing to the tape. Thus, apparatus 800 may selectively disengage the second module 806 and read transducer 808 from being in contact with a tape 818, e.g., using one or more actuators, worm screws, etc. Moreover, the third module 810 may be selectively disengaged from being in contact with the tape 818.

This ability to selectively disengage certain module(s) may be desired during operations including, but not limited to, readback requests and/or seek operations during which the disengaged read transducer and corresponding module are inactive and therefore not required to be in contact with the tape. As a result, apparatus 800 is desirably able to reduce friction between the tape and components of the apparatus, thereby reducing wear and improving efficiency. However, in other embodiments, rather than being disengaged from being in contact with a tape, one or more transducer may be rendered "inactive", e.g., by the controller 814. With reference to the present description, a transducer may be rendered "inactive" by selectively removing a power source, logically disconnecting the transducer from memory, etc., or any other approach which would be obvious to one skilled in the art upon reading the present description.

The apparatus 800 further includes a controller 814 coupled to each of the modules 803, 805, 807, 806, 810, and in turn coupled to the transducers of the respective modules. It should be noted that, although the present embodiment includes a single controller 814 being coupled to each of the transducers 804, 808, 812, 820, 822, in other embodiments one or more of the transducers 804, 808, 812, 820, 822 may be coupled to independent components of the controller. Moreover, controller 814 may include any of the embodiments described above with reference to controller 128 of FIG. 1A.

With continued reference to FIG. 8A, controller 814 is preferably able to control each of the transducers 804, 808, 812, 820, 822. In a specific embodiment, which is in no way intended to limit the invention, the controller 814 may be able to control the head 802 to perform shingled writing. According to the present description, "shingled writing" is intended to mean a currently written track is written over a portion or portions of previously written tracks, thereby defining shingled tracks comprising remaining un-written-over portions of the previously written tracks. Looking specifically to the present embodiment, write transducer 804 forms a shingled track 850 by writing a track 852 over a portion of previously written track 854. In different embodiments, shingled tracks may be formed using serpentine or non-serpentine writing as will be described in further detail below, e.g., see FIGS. 10A-10C.

As previously mentioned, when a track is written over a portion or portions of previously written tracks, shingled tracks are defined as the remaining un-written-over portions of the previously written tracks. Therefore it follows that the track width $w_1$ of such shingled tracks 850 are narrower than the track width $w_2$ of a currently written track 852 that has not yet been shingled.

Moreover, the controller 814 is also preferably able to read data from at least one of the shingled tracks during the shingled writing, e.g., using dedicated read transducer 808 and/or second dedicated read transducer 812. Thus, apparatus 800 is preferably able to perform shingled writing while also being able to read data from at least one of the shingled tracks concurrently with the shingled writing being performed. It follows that the dedicated read transducer 808 and/or other transducers used to read data from at least one of the shingled tracks (e.g., second read transducer 812) preferably has a width $w_5$ in the crosstrack direction 816 about equal to or smaller than the width $w_1$ of the shingled tracks 850. This allows the dedicated read transducer 808 to read data from the shingled tracks 850 without extending over the edges of a shingled track, thereby preventing interference from one or more adjacent tracks.

The width $w_4$ of read transducer 820 is less than the width $w_3$ of the write transducer 804. In some embodiments, the width $w_4$ of read transducers 820, 822 may be similar to, or larger than, the width $w_5$ of the read transducer 808 in the crosstrack direction 816.

Controller 814 may also control one or both of the read transducers 820, 822 for performing read while write verification in real time, e.g., during the shingled writing, as would be appreciated by one skilled in the art upon reading the present description. Thus, depending on the intended direction of tape travel, read transducer 820 may be used to read verify the non-shingled data written by the write transducer 804 when the tape is traveling in a first direction, while read transducer 822 may be used to read verify the non-shingled data written by the write transducer 804 when the tape is traveling in a second direction opposite the first direction. Thus, apparatus 800 has bilateral read while write verification functionality. However, other embodiments may be configured for unilateral functionality.

Referring still to FIG. 8A, the controller 814 may be able to read data from at least one of the shingled tracks during the shingled writing using dedicated read transducer 808 and/or second dedicated read transducer 812, as suggested above. Thus, in some embodiments, controller 814 may be able to perform read verification of shingled tracks 850 while performing shingled writing, e.g., using the write transducer 804. Preferably read verification of shingled tracks 850 may be performed in less than a wrap of tape, but may be performed using more or less tape, depending on the desired embodiment.

It follows that, depending on the direction of tape travel, dedicated read transducer 808 and/or second dedicated read transducer 812 may be used to read data from one of the shingled tracks 850. Thus, the controller 814 may be configured to use the dedicated read transducer 808 to read data from the one of the shingled tracks when the tape is traveling in a first direction. Moreover, the controller 814 may also be configured to use the second dedicated read transducer 812 to read data from another of the shingled tracks when the tape is traveling in a second direction opposite the first direction. As a result, apparatus 800 is capable of performing bidirectional reading of shingled tracks. Furthermore, read transducers 808, 812 are preferably able to read shingled tracks while the write transducer 804 performs shingled writing. Thus, apparatus 800 may perform read verification of shingled tracks 850 as the shingled tracks are defined by write transducer 804 writing over portions of said tracks 854.

In further embodiments, the controller 814 may be configured to use both read transducer 808 and second read transducer 812 to read data from two distinct shingled tracks concurrently. Thus, dedicated read transducer 808 and the second dedicated read transducer 812 may be positioned such that dedicated read transducer 808 is able to read data from a first shingled track and the second dedicated read transducer 812 is able to read data from a second shingled track that is different than the first shingled track, e.g., as illustrated in FIG. 8B.

Figure 8B:
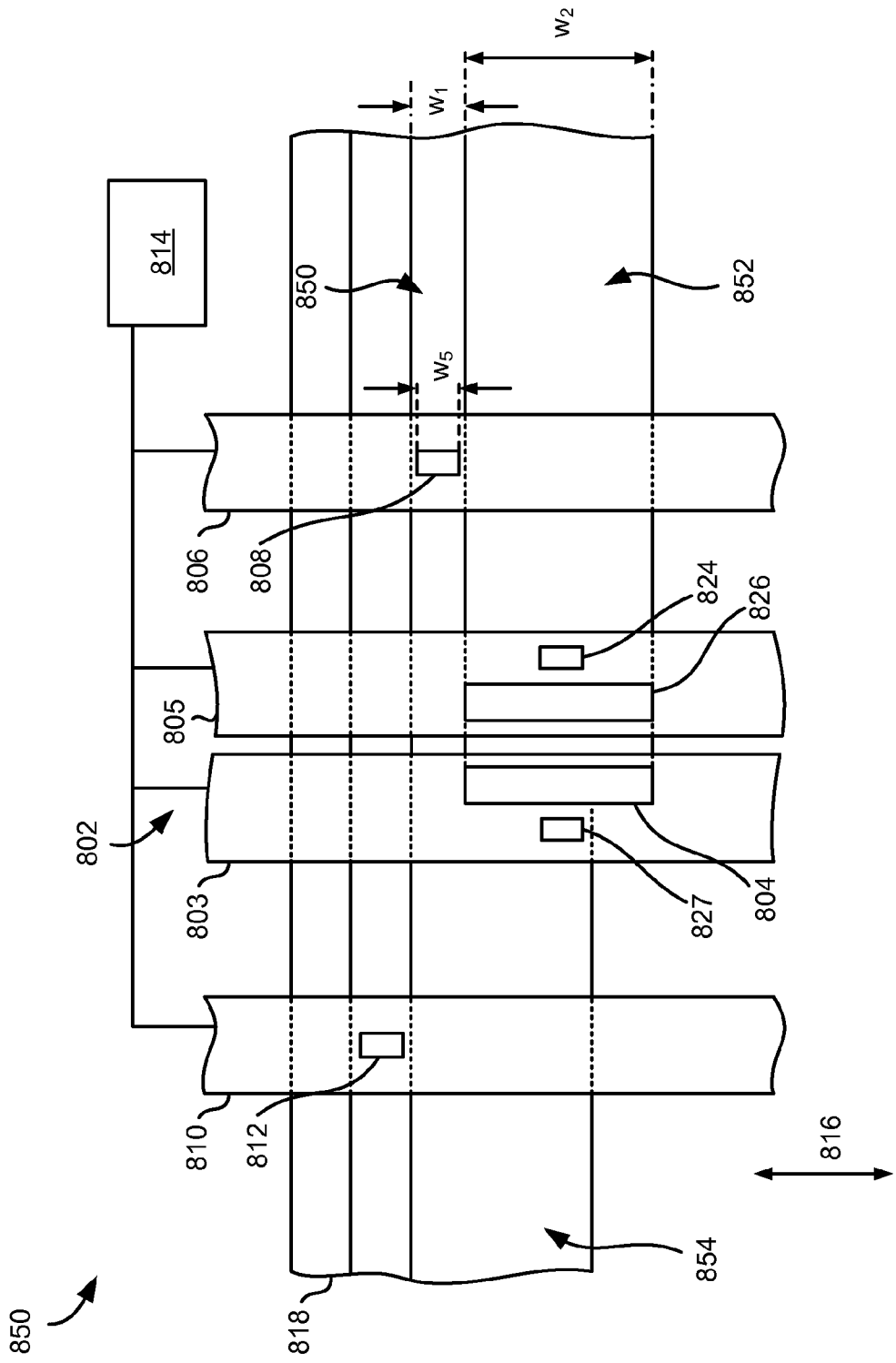
FIG. 8B is a partial top-down view of an apparatus according to one embodiment.

It should also be noted that head 802 of apparatus 850 in FIG. 8B also has a different transducer configuration than that illustrated in FIG. 8A. Specifically, head 802 includes modules 803, 805 having transducers forming a RWWR transducer configuration which includes first write transducer 804, first read transducer 824, second write transducer 826 and second read transducer 827. Moreover, first and second write transducers 804, 826 may include any of the write transducers described and/or suggested herein.

It follows that head 802 of FIGS. 8A-8B may include any desired transducer configuration. For example, according to yet another embodiment, head 802 may include modules for forming a WRW, WRRW, etc. transducer configuration.

In yet further embodiments, additional modules may be included in apparatus 800 having additional transducers positioned thereon, depending on the desired embodiment. Looking to FIG. 8C, an apparatus 870 having a WRW configuration is illustrated according to an exemplary embodiment. As an option, the present apparatus 870 may be implemented in conjunction with features from any other embodiment listed herein, such as those described with reference to the other FIGS., such as FIGS. 8A-8B. Accordingly, various components of FIG. 8C have common numbering with those of FIGS. 8A-8B. Of course, however, such apparatus 870 and others presented herein may be used in various applications and/or in permutations which may or may not be specifically described in the illustrative embodiments listed herein. Further, the apparatus 870 presented herein may be used in any desired environment. Thus FIG. 8C (and the other FIGS.) should be deemed to include any and all possible permutations.

Figure 8C:
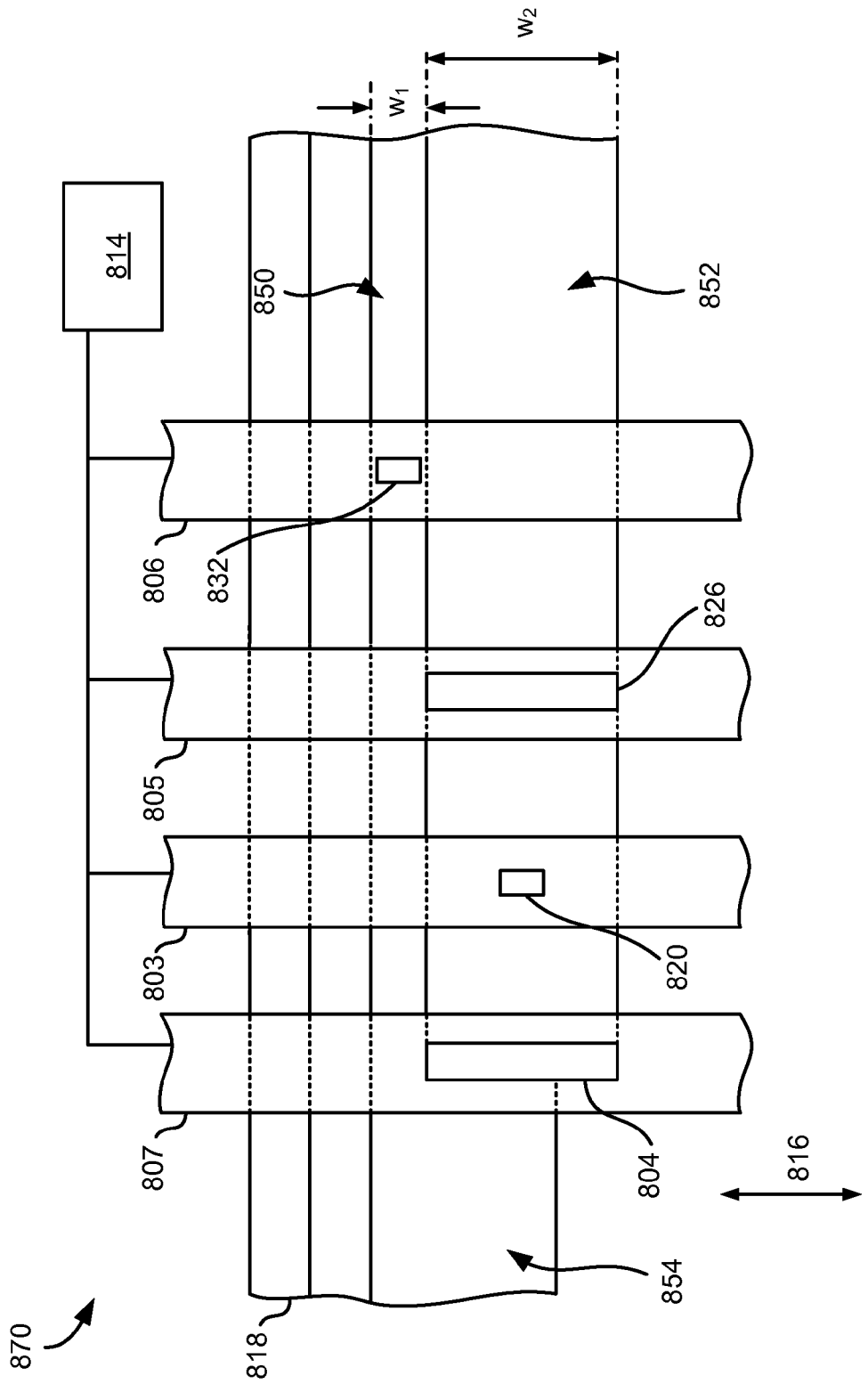
FIG. 8C is a partial top-down view of an apparatus according to one embodiment.

Referring now to apparatus 870 of FIG. 8C, read transducers 820, 832 may be able to perform read-while-write verification of non-shingled data tracks 852 or read data from shingled data tracks 850, e.g., depending on the position of the transducers 820, 832 relative to the data tracks of tape 818. For example, read transducer 820 may be positioned to perform read-while-write verification of data written by first write transducer 804 in track 852, while read transducer 832 is positioned to read data from shingled data track 850.

Figure 9:
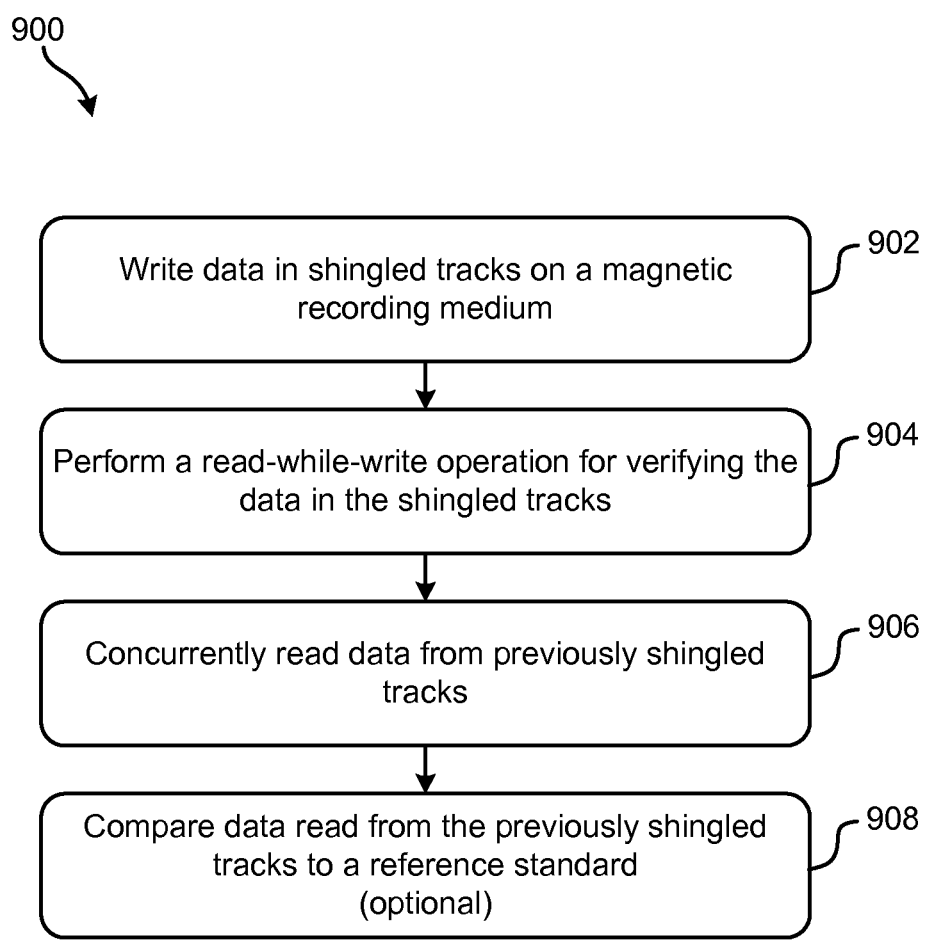
FIG. 9 is a flowchart of a method according to one embodiment.

Referring now to FIG. 9, a method 900 is illustrated in accordance with one embodiment. As an option, the present method 900 may be implemented in conjunction with features from any other embodiment listed herein, such as those described with reference to the other FIGS., such as FIGS. 8A-8B. Specifically, it should be noted that any one or more of the operations of method 900 may be performed by the controller 814 of apparatus 800.

Of course, however, such method 900 and others presented herein may be used in various applications and/or in permutations which may or may not be specifically described in the illustrative embodiments listed herein. Further, the method 900 presented herein may be used in any desired environment. Thus FIG. 9 (and the other FIGS.) should be deemed to include any and all possible permutations.

Looking to FIG. 9, method 900 includes writing data in shingled tracks on a magnetic recording medium. See operation 902. Moreover, operation 904 includes performing a read-while-write operation for verifying the data in the shingled tracks. As described above, shingled tracks include the remaining un-written-over portions of previously written tracks which are defined by tracks being written over portions of previously written tracks as illustrated in FIGS. 8A-8B.

Referring still to FIG. 9, operation 906 of method 900 includes reading data from previously shingled tracks concurrently with operation 904. According to one embodiment, data may be read from previously shingled tracks to ensure compliance with given reference standards. Thus, in an optional operation, method 900 may further include comparing data read from the previously shingled tracks to a reference standard. See optional operation 908. Depending on the desired embodiment, a reference standard may be related to the amplitude, resolution, signal-to-noise ratio (SNR), bit error rate, etc. of the signal being read, e.g., for archival recording quality.

Reference standards may be predefined, set by a user, retrieved from a lookup table, etc. By comparing data read from the previously shingled tracks to a reference standard, method 900 may be able to determine whether data from a data track is preserved after being shingled. In other words, when a new data track is written over a portion of a previously written track, thereby forming a shingled data track, optional operation 908 may desirably be able to determine whether data from the previously written track is preserved for future access and/or use in the now shingled data track.

In certain embodiments having first and second read transducers for reading data from shingled data tracks (e.g., as seen in FIGS. 8A-8B), a leading read transducer may be used in combination with a trailing read transducer for comparing data. Referring back to FIG. 8A momentarily, a leading read transducer 812 may be used to read data from the unshingled data track 854, while a trailing read transducer 808 may be used to read data from the same data track after being shingled by a new data track 852. Moreover, the data from each of the dedicated read transducers 812, 808 may be compared to determine whether the data in the shingled data track 850 matches that of data track 854 prior to being shingled by the new track 852.

In similar embodiments, the data read from shingled tracks may be compared to source data stored in memory. According to the present description "source data" may include the data that was sent to the writers for writing to the tape, which may be maintained in memory. Thus, the data accessible on a shingled data track may be read by a read transducer and compared to the data stored in memory to determine whether the source data matches that of the corresponding shingled data track. Known read-verify methods may be used, e.g., as may be used for the read-while-write verify.

In some embodiments, referring again to FIG. 8B, read transducer 808 may read data from shingled data tracks (e.g., 850) and compare that data to data read from a track prior to being shingled, e.g., as captured by a reader during read-while-write verification, where such data may be cached in memory during the read-while-write verification and later retrieved to perform the comparison.

In some embodiments, the signals read from a shingled track may be matched to corresponding source data whereby any differences between the two sets of data may be flagged and presented to a user, logged, etc. However, in other embodiments, error correction code (ECC) encoding data of the data read from a shingled data track may be compared to ECC encoding data of the source code, e.g., to ensure the two ECC values are within a tolerance, within a range of each other, etc. The type of comparison performed between the data from the shingled track and the source data may be determined based on required processing power, power consumption, etc., or any other performance constraints.

For embodiments where data read from shingled data tracks does not match the corresponding source code and/or data read from shingled data tracks falls short of reference standards, some further action may be taken. For example, a system administrator may reconfigure the transducers and/or controller coupled thereto upon being notified that data read from shingled data tracks falls short of set reference standards for the recording being performed. In other examples, a provider may be contacted for repair and/or replacement of the apparatus or parts thereof. In further embodiments, the data may be rewritten.

As previously mentioned, shingled writing may be performed using serpentine or non-serpentine writing. Moreover, depending on the configuration of the transducers in a given module, more than one method of writing shingled data tracks may be possible. For example, modules having a RWR transducer configuration (e.g., as seen in 802 of FIG. 8A) may conduct non-serpentine writing. This is primarily because a RWR transducer configuration allows the same writer array to write each adjoining data track, despite reversal of the tape direction and/or orientation of the transducer while writing thereto. This may reduce writing errors, readback errors, data loss, etc., as well as reducing the misregistration budgeting requirements, as only one set of track tolerances comes into play. Moreover, using the same writer array to write adjoining data tracks ensures consistency while writing (e.g., by enabling symmetrical servo pattern reading), overall higher areal density, etc.

Figure 10A:
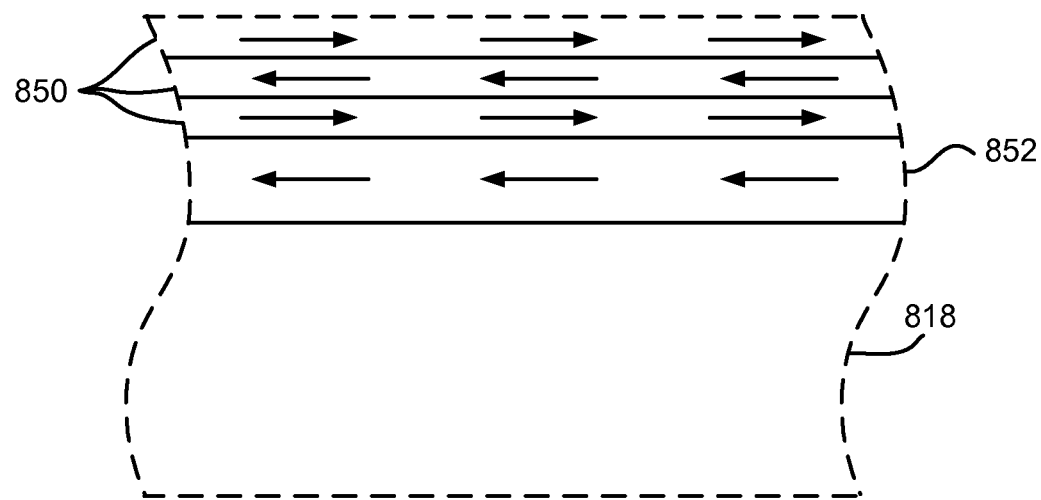
FIG. 10A is a diagram of a tape with shingled tracks written in a non-serpentine fashion according to one embodiment.

Thus, as illustrated in the representational diagram of FIG. 10A, which is in no way intended to limit the invention, the orientation of the arrows in each of the tracks are intended to represent the direction of tape travel when the corresponding track was written to the tape 818.

Note that, while not ideal, a WRW transducer configuration may be used for non-serpentine writing in some embodiments. In such embodiments, it is preferable that, while writing data to adjoining data tracks, especially shingled data tracks, the same writer array is used for the adjoining data tracks. Moreover, similar to the description presented immediately above, different writer arrays may not be perfectly identical due to manufacturing variations, and thus may have different alignment characteristics, and therefore write data differently. For example, the write transducers of one writer array may not have the same pitch, spacing, etc. as the write transducers of another writer array. Thus, using multiple writer arrays to write data to adjoining data tracks may result in small track placement errors, as the data written to the tracks may be aligned differently on each pass. According to another example, using different writer arrays may result in overwriting data on an adjoining track, thereby causing data loss if proper budgeting for this tolerance is not conducted.

However, according to another illustrative embodiment, a module may have a WRW transducer configuration, which is a preferable configuration with which to conduct serpentine writing. While writing data with a WRW configuration, the leading writer and reader are preferably active, while the trailing writer is not active, depending on the intended direction of tape travel. As a result, the leading writer array may be used to write adjoining data tracks for a first direction of tape travel, while the trailing writer array may be used to write adjoining data tracks for a second direction of tape travel opposite the first direction.

Figure 10B:
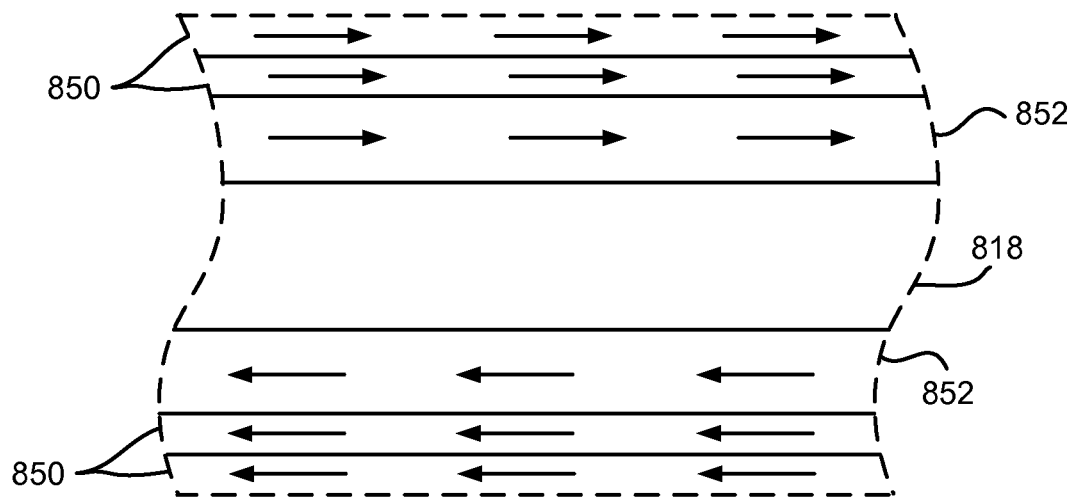
FIG. 10B is a diagram of a tape with shingled tracks written in a serpentine fashion according to one embodiment.

Thus, as illustrated in the representational diagram of FIG. 10B, which is in no way intended to limit the invention, the orientation of the arrows in each of the tracks are intended to represent the direction of tape travel when the corresponding track was written to the tape 818. In contrast to the diagram of FIG. 10A, here data tracks corresponding to a first direction of tape travel are written to the top portion of a data partition, while data tracks corresponding to a second direction of tape travel are written to the bottom portion of the data partition. This preferably reduces writing errors, readback errors, data loss, etc. and ensures consistency while writing, e.g., by enabling symmetrical servo pattern reading.

Figure 10C:
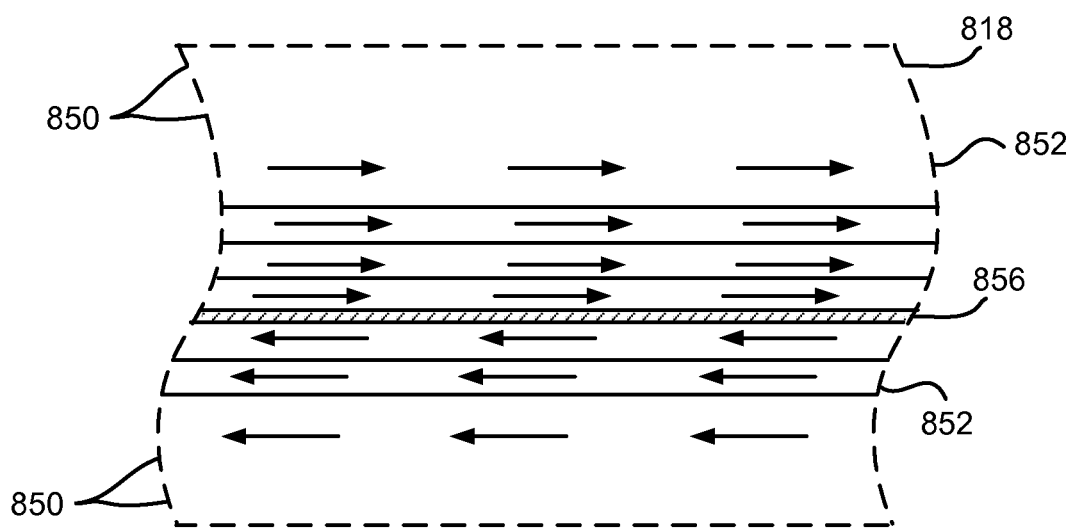
FIG. 10C is a diagram of a tape with shingled tracks written in a center-out serpentine fashion according to one embodiment.

FIG. 10C depicts a center-out serpentine writing pattern. A buffer 856, sometimes called a directional buffer, provides a spacing between the closest tracks written in opposite directions.

Figure 11:
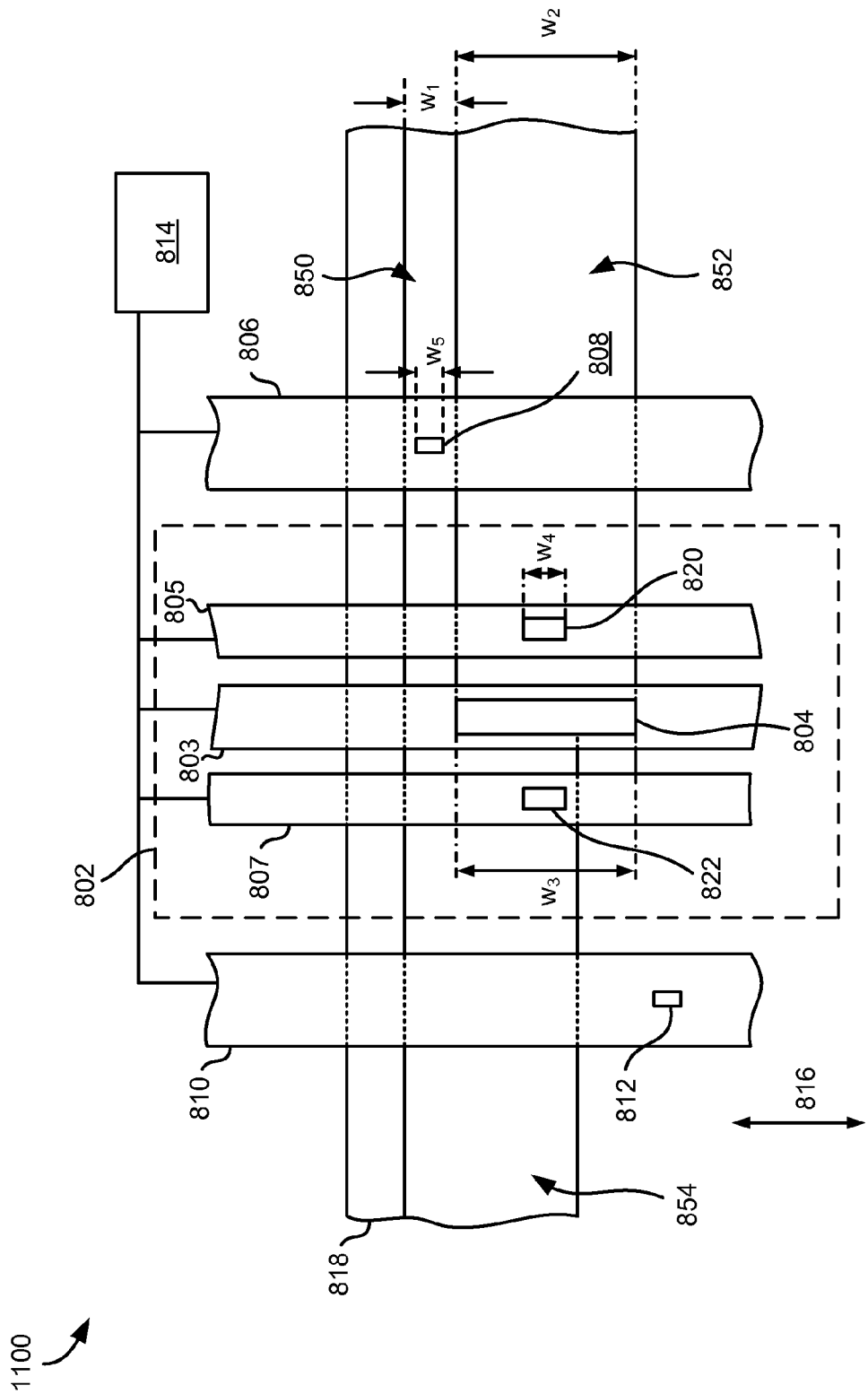
FIG. 11 is a partial top-down view of an apparatus according to one embodiment.

FIG. 11 depicts an apparatus 1100, configured similarly to that of FIG. 8A, but having the position of read transducer 812 shifted downward to enable reading of a shingled track written in a center-out serpentine writing pattern.

It should also be noted that although many of the embodiments illustrated and/or described herein are compatible with magnetic tape media, any of the embodiments herein may be incorporated with other media types, e.g., disk, optical, etc. as would be appreciated by one skilled in the art upon reading the present descriptions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. An apparatus, comprising:
   a controller configured to control a write transducer to perform shingled writing where a currently written track is written over a portions of a previously written track thereby defining a shingled track comprising a remaining portion of the previously written track,
   the controller being configured to cause reading of data from at least one shingled track during the shingled writing using a read transducer.

2. The apparatus as recited in claim 1, wherein the write transducer is positioned on a first module and the read transducer is positioned on a second module separate from the first module, wherein the controller is embodied in hardware.

3. The apparatus as recited in claim 2, wherein the first module and the second module are independently positionable.

4. The apparatus as recited in claim 2, wherein the second module is disengageable from a tape during reading thereof and/or writing thereto.

5. The apparatus as recited in claim 2, comprising a second read transducer on a third module that is separate from the first and second modules, wherein the controller is configured to use the read transducer to read data from the one of the shingled tracks during the shingled writing in a first direction, wherein the controller is configured to use the second read transducer to read data from another of the shingled tracks during the shingled writing in a second direction opposite the first direction.

6. The apparatus as recited in claim 1, wherein the controller is further configured to perform read verification of the shingled tracks during the shingled writing.

7. The apparatus as recited in claim 1, comprising a second read transducer usable for read while write verification, wherein a width of the read transducer in a crosstrack direction is less than a width of the second read transducer in the crosstrack direction.

8. A controller-implemented method, comprising:
   performing, using a controller of a data storage device, shingled writing on a magnetic recording medium where a currently written track is written over a portions of a previously written track thereby defining a shingled track comprising a remaining portion of the previously written track; and
   reading, using the controller, data from at least one shingled track during the shingled writing.

9. The method as recited in claim 8, comprising:
   comparing data read from the at least one shingled track to a reference standard.

10. The method as recited in claim 8, wherein the data read from the at least one shingled track is compared to source data stored in memory.

11. The method as recited in claim 8, wherein a first read transducer used in a read-while-write operation performed during the shingled writing has a greater width in a crosstrack direction than a width in the crosstrack direction of a second read transducer used in reading the data from the at least one shingled track.

12. The method as recited in claim 8, wherein a write transducer used in writing data in shingled tracks is positioned on a first module, a first read transducer used in performing a read-while-write operation is positioned on a second module, and a second read transducer used in concurrently reading the data from the shingled track defined by the writing by the write transducer of the first module is positioned on a third module, wherein the first module is positioned between the second module and the third module in an intended direction of tape travel.

13. The method as recited in claim 12, wherein each of the modules are independently positionable.

14. The method as recited in claim 8, wherein the magnetic recording medium is a magnetic recording tape.

15. A computer program product for reading data from a shingled track during shingled writing, the computer program product comprising a computer readable storage medium having program instructions embodied therewith, wherein the computer readable storage medium is not a transitory signal per se, the program instructions executable by a hardware-based controller of a data storage device to cause the controller to perform a method comprising:
   performing, using the controller, shingled writing on a magnetic recording medium where a currently written track is written over a portions of a previously written track thereby defining a shingled track comprising a remaining portion of the previously written track; and
   reading, using the controller, data from at least one shingled track during the shingled writing.

16. The computer program product as recited in claim 15, comprising program instructions executable by the controller to cause the controller to compare data read from the at least one shingled track to a reference standard.

17. The computer program product as recited in claim 15, wherein the data read from the at least one shingled track is compared to source data stored in memory.

18. The computer program product as recited in claim 15, wherein a first read transducer used in a read-while-write operation performed during the shingled writing has a greater width in a crosstrack direction than a width in the crosstrack direction of a second read transducer used in reading the data from the at least one shingled track.

19. The computer program product as recited in claim 15, comprising program instructions executable by the controller to cause the controller to independently position first, second and third modules, wherein a write transducer used in writing data in shingled tracks is positioned on the first module, a first read transducer used in performing a read-while-write operation is positioned on the second module, and a second read transducer used in concurrently reading the data from the shingled track defined by the writing by the write transducer of the first module is positioned on the third module, wherein the first module is positioned between the second module and the third module in an intended direction of tape travel.

* * * * *